Figure 1:
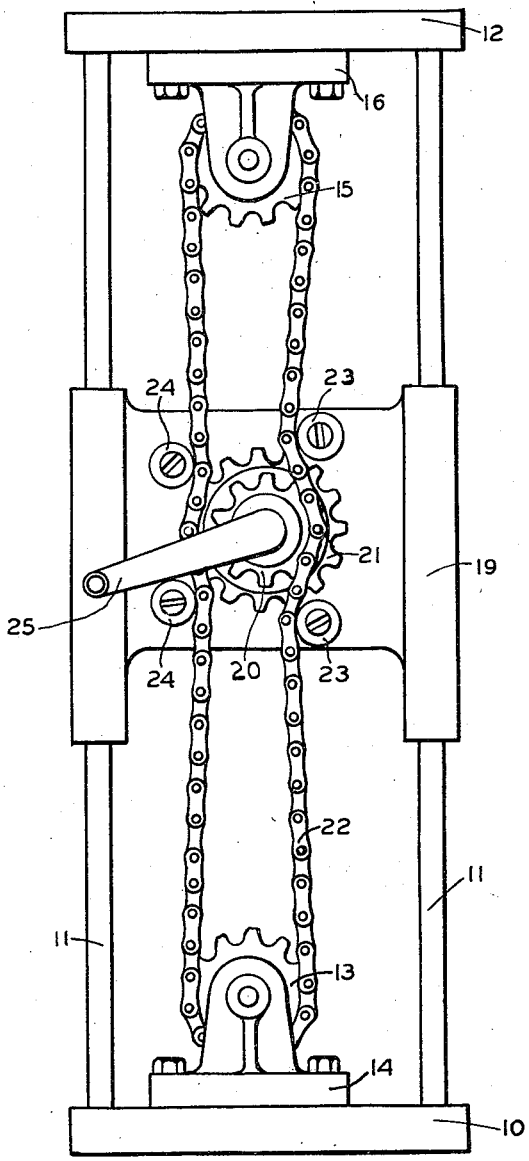

Jan. 26, 1943.   M. J. DRACHMAN   2,309,578
DIFFERENTIAL MECHANISM
Filed Aug. 5, 1942   2 Sheets-Sheet 1

INVENTOR.
MYRON J. DRACHMAN
BY
Bohleber, Fassett & Montstream
ATTORNEYS

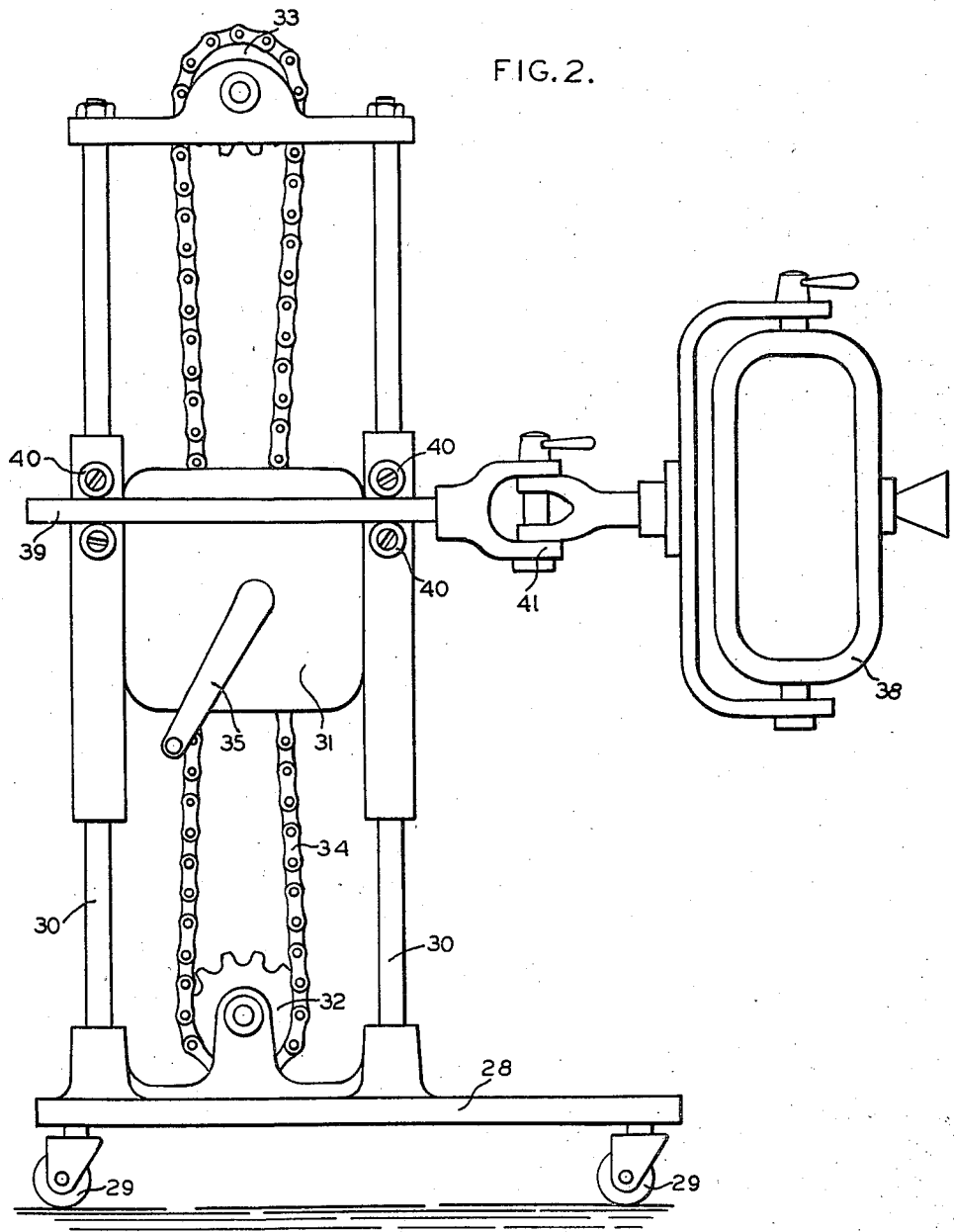

Patented Jan. 26, 1943

2,309,578

UNITED STATES PATENT OFFICE 2,309,578

DIFFERENTIAL MECHANISM

Myron J. Drachman, New York, N. Y., assignor to Peerless Laboratories, Inc., New York, N. Y., a corporation of New York Application August 5, 1942, Serial No. 453,624

9 Claims. (Cl. 248—125)

The invention relates to a differential mechanism of simple construction which has general applicability although it has particular applicability for adjusting the height of an X-ray tube and its associated mechanism because it requires no locking mechanism. Since the differential elevating mechanism is self locking, there is no danger of an expensive X-ray tube dropping suddenly because of the failure of an attendant to lock the same in elevated position as may well occur with other types of means for adjusting the height thereof.

An object of the invention is to construct a new and novel differential mechanism of simplified form.

Another object is to construct an X-ray tube mounting which has sufficient mechanical advantage to be easily adjusted as to height and which also is self locking in any position.

Other objects will be more apparent from the following description taken in connection with the accompanying drawings illustrating a preferred embodiment thereof, in which Figure 1 is a side elevation of the differential mechanism.

Figure 2 is a side elevation of an X-ray tube and its supporting structure in which the differential mechanism is utilized to support and adjust the height of the X-ray tube.

The differential mechanism comprises principally a supporting means, a carriage means movable thereon and the differential means which has a high mechanical advantage. The supporting means illustrated includes a base 10 having a suitable slide such as the bars 11 and a head 12 at upper end of the bars. A movable means or carriage 19 is mounted for movement along the bars 11. It is clear that if desired that means 19 may be fixed and the supporting means may be the movable part.

A differential means is utilized to move one of the aforesaid means with respect to the other. The differential means includes a pair of spaced wheels or pulleys illustrated as a sprocket wheel 13 rotatably carried by a bracket 14 mounted upon the base 10 and a similar pulley illustrated as a sprocket wheel 15 rotatably mounted upon a bracket 16 secured to the head 12. The movable means carries a pair of differential wheels or pulleys illustrated as sprocket wheels 20 and 21 of different diameters, the wheel 20 being smaller than the wheel 21. The sprocket wheels are mounted for rotation on the movable means and are secured together in any suitable way for rotation together. The differential wheels and the spaced wheels are connected together by suitable drive means. A cable in the form of a chain 22 is shown as the preferred drive means which passes around the spaced pulleys or sprocket wheels 13 and 15 and one strand thereof such as the right hand strand engages the smaller diameter sprocket wheel 20 and the other strand engages the larger diameter sprocket wheel 21. The axis of each wheel or pulley 13 and 15 may be inclined in order to compensate for each strand of the chain engaging a sprocket wheel in different vertical planes.

The center or axis of the differential wheels 20 and 21 is spaced laterally from the plane through the centers of the pulleys or wheels 13 and 15. The lateral displacement preferably equals the difference in the radii of the two sprocket wheels whereby the two strands of the chain may engage the differential sprocket wheels with each strand being straight from the spaced wheels 13 and 15 when the two differential sprocket wheels have a diameter such that the sum of their radii equals the diameter of the spaced wheels. If there is a substantial angular displacement of the axis of the spaced wheels with respect to the axis of the differential wheels then it may be necessary to introduce a correction factor. For larger diameters of differential sprockets relatively to the diameter of the spaced wheels, the lateral displacement of the axis will equalize the engagement of both strands of the chain with its respective differential sprocket wheel. In order to insure engagement of each strand of the chain with its sprocket wheel and also to increase the arc of engagement of the chain with the sprocket wheel, a pair of rollers 23 may be carried by the movable means 19 which engages the back of the chain for one wheel and a similar pair of rollers 24 may be used for the other strand of the chain.

The differential mechanism may be operated by rotating one of the sprocket wheels 13 and 15 or rotating the differential wheels 20—21, or it may be operated by pulling the chain. In the illustrated construction a handle 25 rotates the differential sprocket wheels.

Rotation of the sprocket wheels in one direction will raise the movable means 19 and rotation in the other direction will cause the same to be lowered, because of the difference in diameters of the differential wheels or the difference in the peripheral speed. It is clear that the means 19 may be fixed if desired whereupon the other means, including the base 10, bars 11 and head 12 are propelled by the differential mechanism.

Similarly the differential mechanism may be horizontally disposed for horizontal movement.

In Figure 2, the differential mechanism is shown applied to a carriage for raising and lowering an X-ray tube mounting and the tube. A supporting means 28 is provided mounted upon wheels or casters 29 so that the X-ray equipment may be rolled where needed. Bars 30 form a slide for a movable carriage 31 upon which an X-ray tube is mounted. The carriage supports the differential sprocket wheels. The spaced pulleys or sprocket wheels are mounted at the top and bottom respectively of the supporting means. The chain 34 passes around the spaced wheels and engages the differential sprocket wheels as illustrated in Figure 1. A handle 35 may be used to elevate or lower the carriage and X-ray tube. It will be understood, that the differential wheels may be of the same diameter but with a different pitch for the sprocket teeth in one wheel so that the number of teeth in one differential wheel is greater than the number of teeth in its companion wheel.

The carriage 31 is provided with means to adjustably support the X-ray tube 38 alone or with additional apparatus which includes a bar 39 mounted between rollers 40 so that the X-ray tube may be moved towards the carriage or outwardly therefrom. A hinge 41 may be provided to swing the tube upon the bar. Other adjustments may be provided as desired.

With the X-ray tube mounting described the attendant may raise or lower the X-ray tube and its carriage with slight effort because of the mechanical advantage afforded by the differential mechanism. The diameters of the differential sprocket wheels are selected so that the differential mechanism not only has sufficient power or mechanical advantage to raise and lower the heavy X-ray mechanism but also so that it is self locking and hence the carriage remains in position without the need of any other locking mechanism which is particularly desirable in this use. An attendant cannot permit the carriage and X-ray tube to slide or fall down suddenly because of failure to secure a locking mechanism since the differential mechanism is self locking.

This invention provides an improvement in a differential mechanism. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A differential mechanism comprising a supporting means, a movable means mounted upon the supporting means, a differential drive mechanism to propel the movable means including a pair of spaced wheels carried by one of the aforesaid means, differential wheels of different diameters secured together and mounted for rotation upon the other of said means, the differential wheels being located between the spaced wheels, and a cable means passing around the spaced wheels, with one strand thereof engaging one differential wheel and the other strand engaging the other differential wheel.

2. A differential mechanism comprising a supporting means, a movable means mounted upon the supporting means, a differential drive mechanism to propel the movable means including a pair of spaced wheels carried by one of the aforesaid means, differential wheels of different diameters secured together and mounted for rotation upon the other of said means, the differential wheels being located between the spaced wheels, the center of the differential wheels being spaced laterally with respect to the plane through the center of the spaced wheels in order to equalize the engagement of a cable means, and a cable means passing around the spaced wheels, with one strand thereof engaging one differential wheel and the other strand engaging the other differential wheel.

3. A differential mechanism comprising a supporting means, a movable means mounted upon the supporting means, a differential drive mechanism to propel the movable means including a pair of spaced wheels carried by one of the aforesaid means, differential sprocket wheels of different diameters secured together and mounted for rotation upon the other of said means, the differential sprocket wheels being located between the spaced wheels, a chain passing around the spaced wheels with one strand engaging one sprocket wheel and the other strand engaging the other sprocket wheel, means to retain the chain in engagement with the sprocket wheels, and means to rotate one of the wheels.

4. A differential mechanism comprising a carriage, supporting means upon which the carriage is movable, a differential drive mechanism to move the carriage including a pair of spaced wheels carried by the supporting means, differential sprocket wheels of different diameters secured together and mounted for rotation upon the carriage, the differential sprocket wheels being located between the spaced wheels, and a chain passing around the spaced wheels with one strand engaging one sprocket wheel and the other strand engaging the other sprocket wheel.

5. A differential mechanism comprising a carriage, supporting means upon which the carriage is movable, a differential drive mechanism to move the carriage including a pair of spaced wheels carried by the supporting means, differential sprocket wheels of different diameters secured together and mounted for rotation upon the carriage, the differential sprocket wheels being located between the spaced wheels, a chain passing around the spaced wheels with one strand engaging one sprocket wheel and the other strand engaging the other sprocket wheel, means to retain the chain in engagement with the sprocket wheels, and means to rotate one of the wheels.

6. An X-ray tube mounting comprising a carriage, means carried by the carriage to adjustably mount an X-ray tube, supporting means upon which the carriage is vertically movable, a differential drive mechanism to move the carriage including a pair of spaced wheels carried by the supporting means, differential sprocket wheels of different diameters secured together and mounted for rotation upon the carriage, the differential sprocket wheels being located between the spaced wheels and having diameters such that the differential mechanism is self locking, a chain passing around the spaced wheels with one strand engaging one sprocket wheel and the other strand engaging the other sprocket wheel and means to rotate one of the wheels.

7. An X-ray tube mounting comprising a carriage, means carried by the carriage to adjustably mount an X-ray tube, supporting means upon which the carriage is movable, a differential drive mechanism to move the carriage including a pair of spaced wheels carried by the supporting means, differential sprocket wheels of different diameters secured together and mounted for rotation upon the carriage, the differential sprocket wheels being located between the spaced wheels and having diameters such that the differential mechanism is self locking, a chain passing around the spaced wheels with one strand engaging one sprocket wheel and the other strand engaging the other sprocket wheel, means to retain the chain in engagement with the differential sprocket wheels, and means to rotate one of the wheels.

8. A differential mechanism comprising a supporting means, a movable means mounted upon the supporting means, a differential drive mechanism to propel the movable means including a pair of spaced wheel means carried by one of the aforesaid means, differential wheels secured together and mounted for rotation upon the other of said means, the differential wheels being located between the spaced wheel means, and a drive means engaging each side of the spaced wheel means with one side thereof engaging one differential wheel and the other side engaging the other differential wheel.

9. A differential mechanism comprising a supporting means, a movable means mounted upon the supporting means, a differential drive mechanism to propel the movable means including a pair of spaced wheel means carried by one of the aforesaid means, differential wheels of different diameters secured together and mounted for rotation upon the other of said means, the differential wheels being located between the spaced wheels, and a drive means engaging each side of the spaced wheel means with one side thereof engaging one differential wheel and the other side engaging the other differential wheel.

MYRON J. DRACHMAN.